April 14, 1959     P. A. MANOR     2,881,687
AIR SUPPLY SYSTEM
Filed May 21, 1952     2 Sheets-Sheet 1
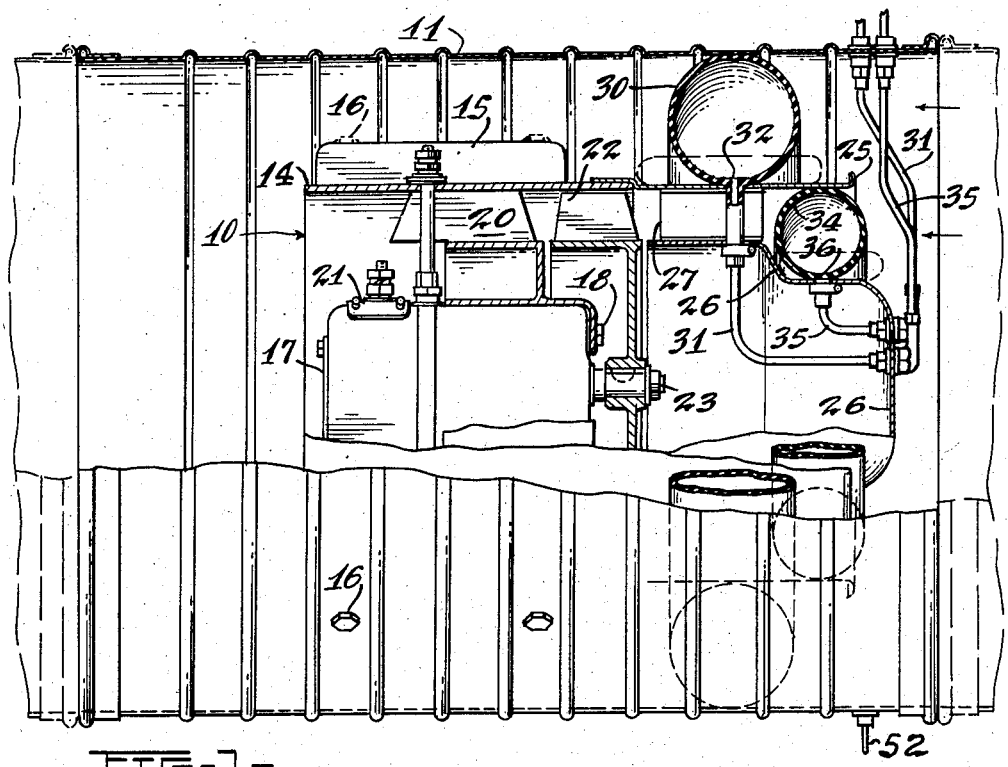
FIG-1-
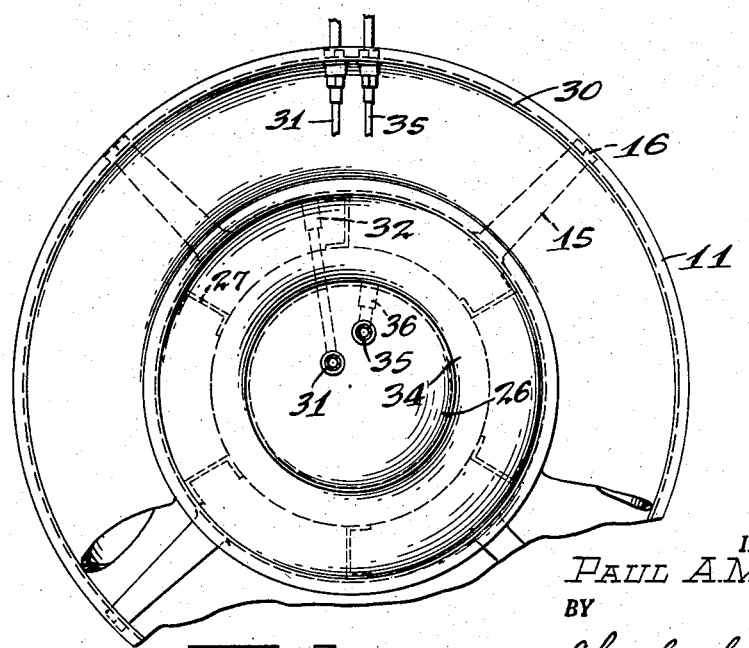
FIG-2-
INVENTOR:
PAUL A. MANOR.
BY
Charles S. Haughey
AGENT.

April 14, 1959 P. A. MANOR 2,881,687
AIR SUPPLY SYSTEM
Filed May 21, 1952 2 Sheets-Sheet 2
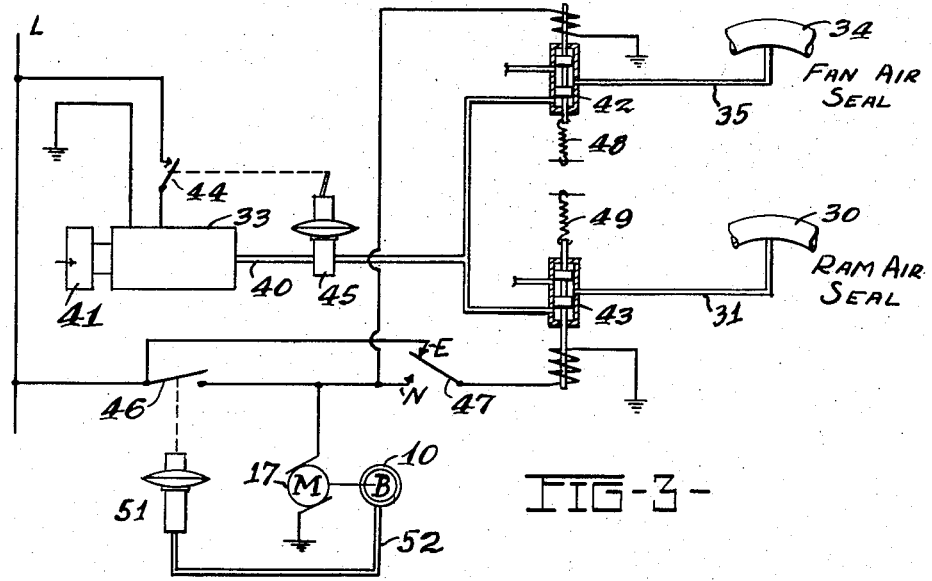
FIG-3-
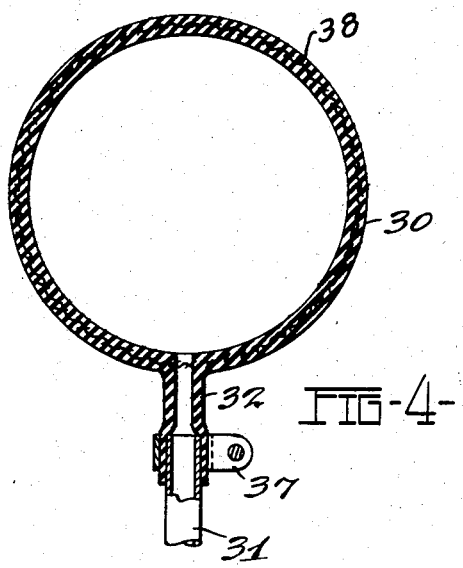
FIG-4-
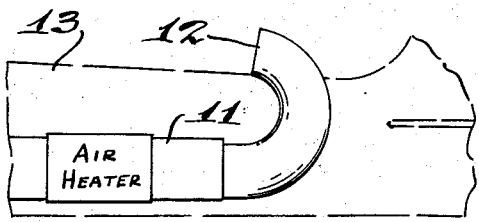
FIG-5-
INVENTOR:
PAUL A. MANOR.
BY
Charles S. Haughey
AGENT United States Patent Office 2,881,687
Patented Apr. 14, 1959

2,881,687
AIR SUPPLY SYSTEM

Paul A. Manor, Columbus, Ohio, assignor to Surface Combustion Corporation, Toledo, Ohio, a corporation of Ohio Application May 21, 1952, Serial No. 289,229

5 Claims. (Cl. 98—1)

The present invention relates to an air supply and valve system which is particularly useful in air supply systems for moving vehicles such as, for example, air intake ducts for aircraft heaters.

When it is desired to supply air under pressure to an aircraft heater, and a ram air duct is used to supply air during flight but a blower is used on the ground, it is desirable to place a blower in the ram air duct. If ram air is then forced to flow through a windmilling blower during flight, the blower offers resistance to air flow, presents icing troubles, and may be damaged by excessive air flow. If ram air is by-passed around the blower, then it is necessary to supply valve means to close off the portion of the duct leading to the blower to prevent its windmilling when ram air is supplied, and valve means to close off the by-pass duct around the blower so that when on the ground the blower can supply sufficient pressure to force air through the resistance presented by the air heater. Such valves are known, and are generally of metallic vanes sufficiently strong and tight fitting to withstand the necessary air pressures in service, but they become brittle when cold, get dirty and stick, and give rise to icing troubles and the like which together with other factors of service may cause such air valves to freeze or to fail as is well known. The present invention provides a solution to the many problems involved in adequately valving such an air supply system.

For a consideration of what I believe to be novel and my invention, attention is directed to the following disclosure and the claims at the end thereof.

In the drawings forming a part of this disclosure,

Fig. 1 is a partially vertically sectioned view of an air duct, blower and valve system according to the present invention.

Fig. 2 is a partially sectioned view of an end of the apparatus of Fig. 1.

Fig. 3 is a schematic control diagram for the apparatus of Fig. 1.

Fig. 4 is a sectional view through an element shown in Fig. 1.

Fig. 5 shows the apparatus of Fig. 1 in its normal environment.

According to the invention an axial-flow blower 10 is concentrically located within a ram air duct 11 which receives air from an air ram 12 of an aircraft 13. The blower comprises a sleeve 14 which is concentrically supported within the duct 11 by flanges 15 and bolts 16, and the sleeve in turn supports concentrically within itself a blower motor 17 by bolts 18 and discharge stator vanes 20. Electric power is supplied to the blower motor 17 through flanged connector 21 on the motor, the wires therefor passing through the duct 11 at a point not shown. The blower further comprises an axial-flow type impeller 22 supported on the shaft 23 of the blower motor.

When ram air is supplied to the duct 11 it is very desirable, and in fact practically necessary, to prevent flow of air through the axial flow impeller of the blower unit to prevent windmilling, etc. Also, when the blower is utilized to supply air to a heater downstream of the blower, it is evident that air discharged through the downstream stator vanes will pass between the duct 11 and the sleeve 14 back to the impeller 22 unless a valve means is provided to prevent such air recirculation.

To provide such a valve, a valve assembly is installed in the duct 11 upstream of the blower, comprising an extension 25 for the sleeve 14, a central cup member 26 supported from the extension 25 by vanes or ribs 27. An outer inflatable tube 30 is supported on the extension 25 which when inflated by fluid, preferably dry air, delivered thereto through pipe 31, and inlet 32 secured thereto by a clamp 37, from a suitable compressor 33 will inflate to the shape illustrated in Fig. 1, filling the annular space between the duct 11 and the extension 25 to constitute an effective seal in the ram air passage.

A second inflatable tube 34 on the cup member 26 is similarly inflatable from fluid supplied by the compressor 33 through pipe 35 and tube inlet 36, and when so inflated constitutes a seal in the fan air duct formed by the cup member 26 and the extension 25. When both tubes are inflated as shown in full lines in Fig. 1, the entire ram air duct 11 is sealed from the inlet of ram air. This is desirable in cases of heater failure when in flight to prevent inlet of excessively cold air to the aircraft. When ram air is used in flight and the blower is not used, the second inflatable tube 34 is inflated and the outer tube 30 is deflated to the position shown in the broken line outline in Fig. 1, thus allowing ram air to pass through the ram air duct formed between the duct 11 and the sleeve 14. When the aircraft is on the ground and air is required the ram air duct is sealed off by inflating the outer tube 30 and deflating the inner tube 34 to the position shown by the broken line outline, thus sealing off the ram air and allowing the blower impeller 22 to move air through the duct 11.

A control system for the inflatable tube type air valves is illustrated in Fig. 3 and comprises a compressor 33 for supplying air under pressure to inflate the inflatable tubes 30 and 34 which form the ram air seal and the fan air seal, respectively. An air conduit 40 delivers air through a suitable desiccator 41 (which is preferably filled with a desiccant of the indicating type, which, for example, turns blue as it absorbs moisture), through the compressor 33, through a pressure controller 45 thence to respective fan and air seal solenoid operated air valves 42 and 43 and to the respective tubes, or seals, 30 and 34.

The electrical control system for these pneumatic air valves comprises a two pole switch 44 in both the power and the ground circuits to the compressor 33 motor, the switch 44 being operable by the pressure controller to close at a pressure of 20 pounds per square inch in pipe 40, and to open at a pressure of 25 p.s.i. thus maintaining a conduit 40 pressure at all times between 20 and 25 p.s.i. It will be understood that the pressure used to inflate the tubes 30 and 34 will depend on many factors. The tube illustrated has an integral cloth web 38 built into the tube, and is more reliable than an unreinforced tube. It has operated at −65° F., but generally requires higher pressures to operate than the plain rubber tube, one of which has operated satisfactorily at pressures as low as 4 p.s.i.

With a constant source of compressed air for operating the inflatable air valves at any time when power is available to the aircraft, suitable controls may be provided to operate the solenoid operated air valves 42 and 43. This may be done as illustrated in Fig. 3. When a blower switch 46 is closed, current from the power line L is delivered to the motor 17 of the blower 10 and to the fan air valve 42, starting the blower and causing the solenoid valve 42 to vent the fan air seal to the atmosphere, deflating the tube 34. The switch 46 also supplies current through switch 47 in its normal contact N to energize the solenoid of ram air seal valve 43, moving that valve to connect the compressor 33 to the ram air seal tube 30, inflating it to seal off the ram air passage between the sleeve 14 and the duct 11.

While the aircraft is on the ground the heater will be operated by the blower, with the blower switch 46 closed and the ram air seal switch 47 on its normal operating contact N. To shift from fan air to ram air, the pilot or operator merely opens the blower switch 46. This de-energizes the blower motor and the solenoids of the fan and ram air valves 42 and 43, allowing their springs 48 and 49 to return the valves to their non-energized positions where the ram air valve 43 will vent the ram air seal tube 30 to deflate it and the fan air seal valve 42 will connect the tube 34 to the compressor air conduit 40 to inflate the tube 34 and thus seal off the fan.

In the event that the heater fails in flight or for other reason it is desired to completely close off the ram air duct, the blower switch 46 is opened, if it is not already open, to de-energize the fan air seal valve and cause the tube 34 to be inflated, and the ram air seal switch 47 is moved to the emergency position E where it then energizes the ram air valve solenoid to cause the ram air seal tube 30 to inflate and complete the sealing of the ram air duct 11. The control system will then be as illustrated in Fig. 3, and both air seals will be inflated as illustrated in Figs. 1 and 2.

While a manual switch 46 may be used for turning from fan air to ram air, it will be readily appreciated that a ram air responsive switch could be adapted to perform this function. Similarly this ram air seal switch 46 could be adapted to close upon ignition failure of the aircraft heater to which it supplies air, as a safety measure. To make automatic the changeover from fan air to ram air, and from ram air to fan air, thus relieving the pilot of an aircraft of one more detail upon take-off and landing, a pressure responsive servo mechanism 51 such as a diaphragm valve, is adapted to respond through conduit 52 to pressure upstream of the valve system in the duct 11 to close the switch 46 at relatively low pressures and to open switch 46 at relatively higher pressures. Thus when the ram air pressure in duct 11 exceeds a certain minimum pressure, the fan would automatically be turned off, and when the ram air pressure in the duct 11 exceeded that minimum, the fan would be turned off, the inflatable tube air valves being operated as described.

While the materials of which the tubes 30 and 34 are made are required to be flexible and adequately strong at the air temperatures and pressures which they will meet, a wide range of satisfactory materials such as natural and synthetic rubbers is available for this purpose.

I claim:

1. In an air supply system for aircraft, an air supply duct leading to the exterior of the aircraft and constituting a ram air inlet duct; a sleeve within said duct dividing the same into inner and outer air passages; a blower within said sleeve for moving air through the inner air passage; support means disposed in the inner air passage; a first inflatable tube supported by the support means and adapted to operate to close the inner air passage when inflated and to open said passage when deflated; a second inflatable tube in the outer air passage adapted to close the outer air passage when inflated and to open said passage when deflated; a fluid compressor; and conduit means for delivering fluid under pressure to said tubes for inflating the same.

2. In an air supply system according to claim 1, the improvement comprising second conduit means for delivering air to the compressor, and a desiccator in one of the first mentioned and second conduits for drying air delivered to said tubes.

3. In an air supply system according to claim 1, the improvement comprising valve means in said conduit means for alternately opening said conduit means to the respective first and second tubes; and a servo mechanism for operating said valve means; said servo mechanism being responsive to pressure upstream of said tubes in the air supply duct and adapted to operate the valve means to open the conduit means to the first tube when said pressure is relatively high and to open the conduit means to the second tube when said pressure is relatively low.

4. An air supply system according to claim 3 wherein the servo mechanism is adapted to operate said blower when said first tube is deflated.

5. An air supply system comprising an air duct adapted to be connected to a source of air under high pressure or to a source of air under low pressure; a sleeve within the duct dividing the same into inner and outer air passages; a blower within the sleeve; a first inflatable tube in the inner air passage; a second inflatable tube in the outer air passage; inflating means for inflating said tubes; and control means responsive to air pressure in said duct upstream of said tubes for causing the inflating means to inflate the first tube to close the inner air passage, to deflate the second tube to open the outer air passage and to prevent operation of the blower when said air pressure is relatively high, and to deflate the first tube to open the inner air passage, inflate the second tube to close the outer air passage, and to cause the blower to operate when said air pressure is relatively low.

References Cited in the file of this patent

UNITED STATES PATENTS

| 184,240 | Harris | Nov. 14, 1876 |
| 594,056 | Yarnold et al. | Nov. 23, 1897 |
| 1,873,138 | Mitchell | Aug. 23, 1932 |
| 2,064,587 | Carlstedt | Dec. 15, 1936 |
| 2,377,794 | Lobelle | June 5, 1945 |
| 2,393,042 | Hagen | Jan. 15, 1946 |
| 2,409,433 | Hunter | Oct. 15, 1946 |
| 2,466,851 | Honerkamp et al. | Apr. 12, 1949 |
| 2,487,226 | Eastman | Nov. 8, 1949 |
| 2,584,889 | Latour | Feb. 5, 1952 |
| 2,598,207 | Bailey et al. | May 27, 1952 |
| 2,653,754 | McDonald | Sept. 29, 1953 |
| 2,687,145 | Carter | Aug. 24, 1954 |

FOREIGN PATENTS

| 902,062 | France | Nov. 20, 1944 |
| 258,092 | Switzerland | Apr. 16, 1949 |